United States Patent
Wu

(10) Patent No.: US 7,770,218 B2
(45) Date of Patent: Aug. 3, 2010

(54) METHOD AND SYSTEM FOR CLEARING A PASSWORD ON A COMPUTER

(75) Inventor: Lei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 807 days.

(21) Appl. No.: 11/309,538

(22) Filed: Aug. 18, 2006

(65) Prior Publication Data

US 2007/0094739 A1    Apr. 26, 2007

(30) Foreign Application Priority Data

Oct. 21, 2005    (CN)    ......................... 2005 1 0100570

(51) Int. Cl.
*G06F 12/00*    (2006.01)
*G06F 7/04*    (2006.01)
*G06F 12/14*    (2006.01)
*G06F 13/00*    (2006.01)
*G06F 17/30*    (2006.01)
*G11C 7/00*    (2006.01)
*G06F 21/00*    (2006.01)

(52) U.S. Cl. .......................... 726/18; 713/182; 713/184; 713/186

(58) Field of Classification Search ..................... 726/18
See application file for complete search history.

(56) References Cited

U.S. PATENT DOCUMENTS

| 5,485,622 | A  * | 1/1996 | Yamaki ........................ 726/18 |
| 6,360,322 | B1   | 3/2002 | Grawrock |
| 2003/0182584 | A1 * | 9/2003 | Banes et al. ................. 713/202 |
| 2004/0107367 | A1 * | 6/2004 | Kisters ........................ 713/202 |
| 2005/0182945 | A1 * | 8/2005 | Ali et al. ...................... 713/182 |

* cited by examiner

*Primary Examiner*—Shin-Hon Chen
(74) *Attorney, Agent, or Firm*—Wei Te Chung

(57) ABSTRACT

A system for clearing a password on a computer, the system includes an unlocking apparatus corresponding to a keyboard interface of the computer. The unlocking apparatus includes contacts and are configured so that two of the contacts are connected within the apparatus and when the apparatus is received in the keyboard interface, the computer recognizes the connection as a command to clear an access code of the computer. A method for clearing a password on a computer is also disclosed.

8 Claims, 2 Drawing Sheets

METHOD AND SYSTEM FOR CLEARING A PASSWORD ON A COMPUTER

DESCRIPTION

1. Field of the Invention

The invention relates to a method and system for clearing passwords. In particular, the present invention relates to a method and system for clearing an access password on a notebook computer, which a user has forgotten, allowing the user to access the notebook computer.

2. Description of Related Art

Portable computer systems, such as notebook and laptop computers, can be worth many thousands of dollars, and are small and easy to carry away. This has made portable computer systems a favorite target of thieves. Computer manufacturers have made an infrared alarm device on a chassis of the notebook computer to deter theft, but the infrared alarm device is exterior to the notebook computer and is easily damaged.

At present, a conventional method is to use a password to protect the notebook computer. Anybody who wants to use or move the notebook computer must enter the correct password, or a warning alarm is sounded. However, a user of the notebook computer may forget the password. When this happens it is inconvenient and may be costly, if professional help is required to resolve the problem.

What is needed is a method and system for clearing an access password of a notebook computer when a user has forgotten the password.

SUMMARY OF THE INVENTION

An exemplary system for clearing a password on a computer is provided. The system includes an unlocking apparatus corresponding to a keyboard interface of the computer. The unlocking apparatus includes contacts and are configured so that two of the contacts are connected within the apparatus and when the apparatus is received in the keyboard interface, the computer recognizes the connection as a command to clear an access code of the computer. A method for clearing a password on a computer is also disclosed.

Other advantages and novel features will become more apparent from the following detailed description when taken in conjunction with the accompanying drawing, in which:

DETAILED DESCRIPTION OF THE INVENTION

Figure 1:
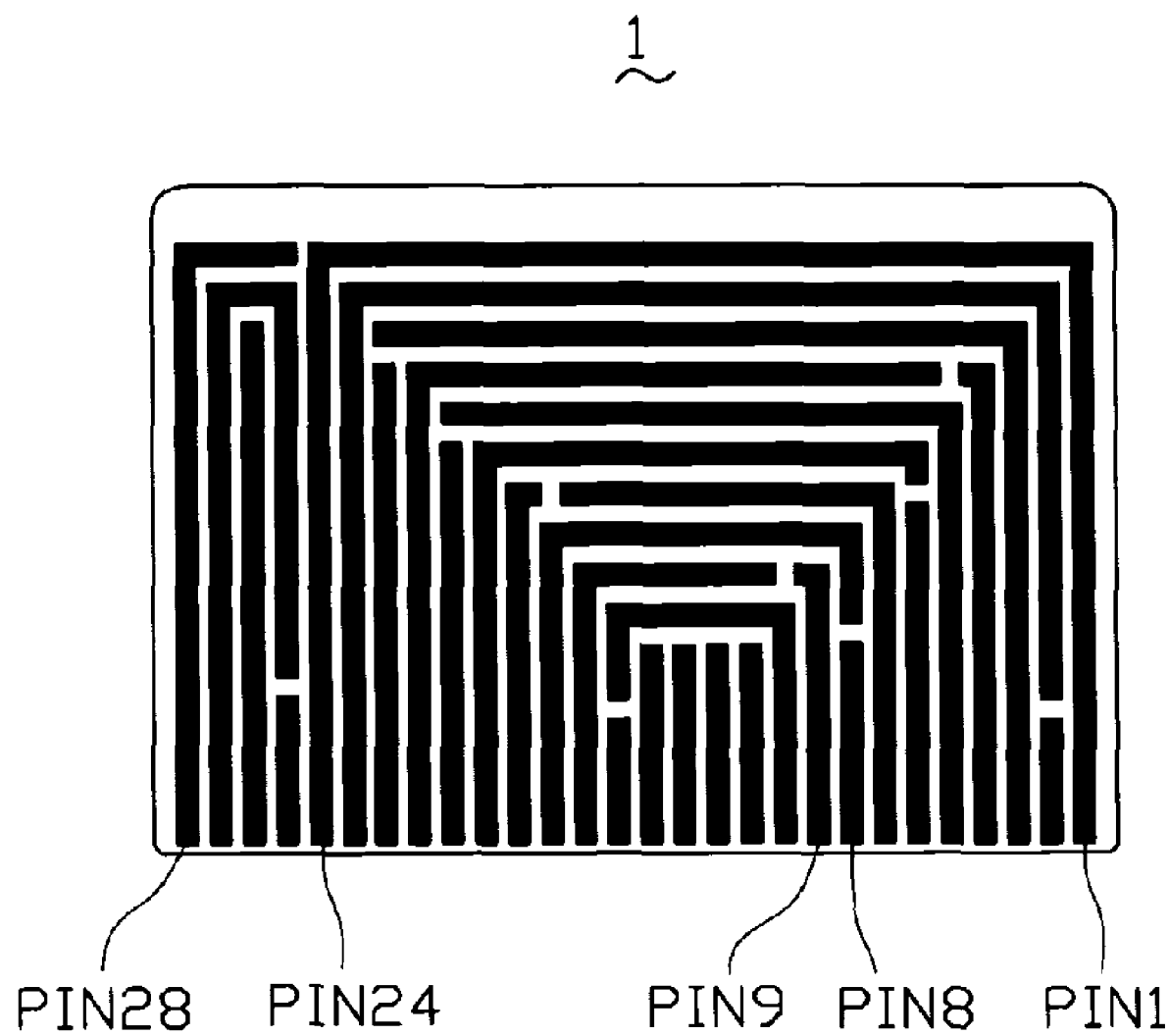
FIG. 1 is a structure plan of an unlocking apparatus in accordance with a preferred embodiment of the present invention.

Referring to FIG. 1, an unlocking apparatus 1 in accordance with a preferred embodiment of the present invention is shown. The unlocking apparatus 1 is made of flexible flat cable with 28 contacts corresponding to pins of a keyboard interface 2 (see FIG. 2) of a notebook computer. In the keyboard interface 2, most of combinations of the pins are defined corresponding to buttons of a keyboard and some of pin combinations are undefined. In this preferred embodiment, one undefined pin combination is defined in a keyboard driver and software of the computer as a command to clear an access password of the computer. The unlocking apparatus 1 is configured (i.e., structured and arranged) so that two of the contacts, for example PIN 1 and PIN 24, are electrically connected within the apparatus 1. When the apparatus 1 is received by the keyboard interface 2, the two electrically connected contacts of the apparatus 1 electrically contact with the above pin combination of the keyboard interface 2 which is defined as a clear command, whereby the computer recognizes the connection as the command to clear an access code of the computer.

In other embodiments, the unlocking apparatus 1 may be made of other than flat cable such as a circuit board with appropriate contacts and configured to be received by the keyboard interface 2 of the computer.

Figure 2:
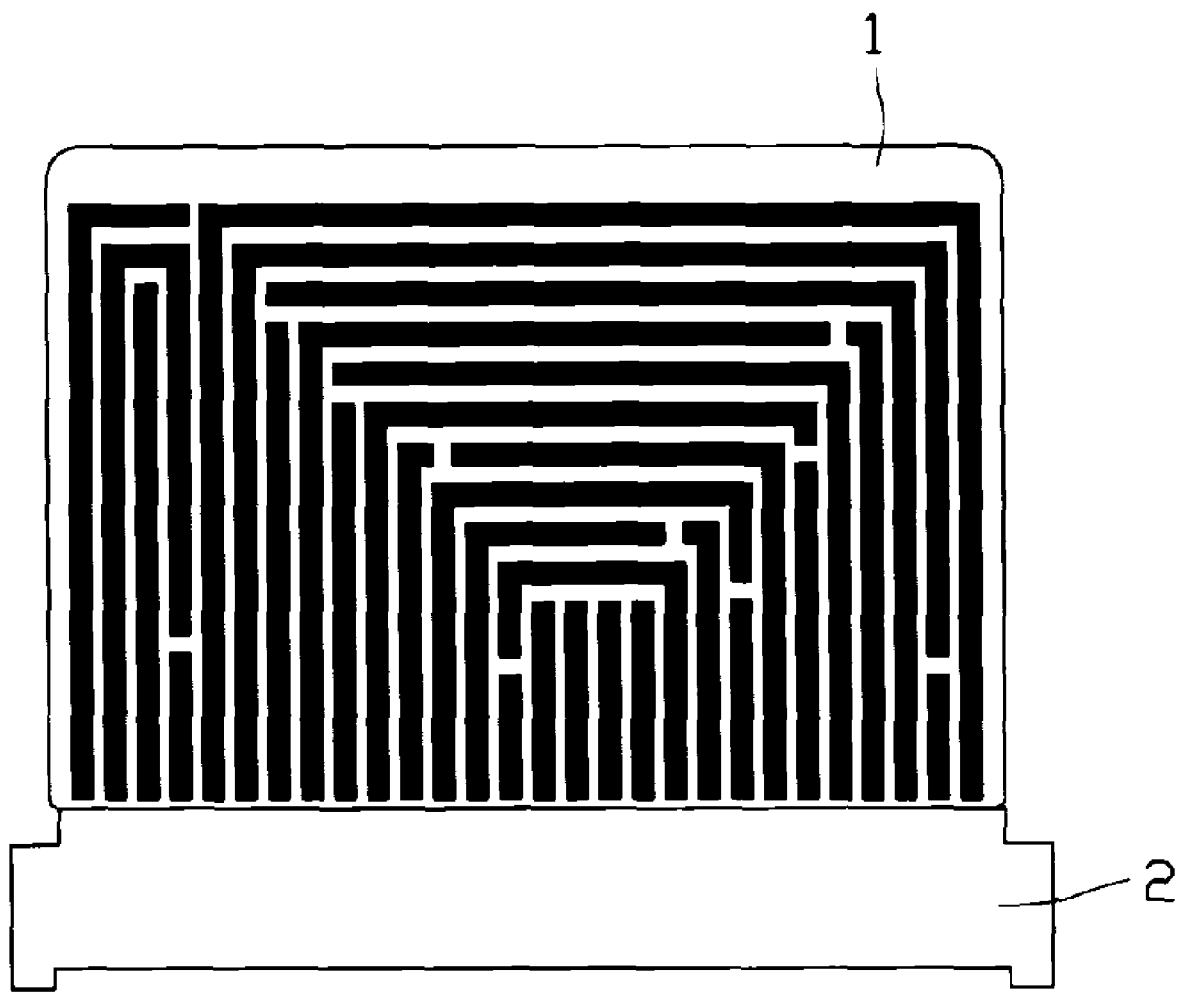
FIG. 2 is an assembled view of the unlocking apparatus of FIG. 1 with a keyboard interface of a notebook computer.

Referring to FIG. 2, if a user forgets the access password, the unlocking apparatus 1 is connected to the keyboard interface 2 of the notebook computer and the access password is cleared allowing immediate access to the computer.

A method for clearing an access password of a computer applying the unlocking apparatus 1 in accordance with a preferred embodiment of the present invention includes the following steps: (1) determining an undefined pin combination of a keyboard interface 2 (see FIG. 2) and defining that pin combination in a keyboard driver and software of the computer as a command to clear the access password; (2) inserting the unlocking apparatus 1 into the keyboard interface 2 of the computer to activate the command to clear the access password.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A system for clearing a password on a computer, the system comprising:

an unlocking apparatus corresponding to a keyboard interface of the computer, the unlocking apparatus comprising contacts corresponding to contacts of the keyboard interface, wherein an undefined pin combination of the keyboard interface is defined in a keyboard driver and software of the computer as a command to clear the password on the computer, two contacts of the unlocking apparatus correspond to the pin combination of the keyboard are connected together, so that when the unlocking apparatus is connected to the computer via the keyboard interface, the computer recognizes the connection of the two contacts of the unlocking apparatus as the command to clear the password on the computer.

2. The system as claimed in claim 1, wherein the unlocking apparatus is made of flexible flat cable with contacts corresponding to contacts of the keyboard interface.

3. The system as claimed in claim 1, wherein the unlocking apparatus is a circuit board with contacts and configured to be received by the keyboard interface of the computer.

4. A method for clearing a password on a computer, the method comprising:

determining an undefined pin combination of a keyboard interface of the computer and defining that pin combination in a keyboard driver and software of the computer as a command to clear the password;

inserting an unlocking apparatus which comprises contacts corresponding to contacts of the keyboard interface into the keyboard interface of the computer, wherein two contacts of the unlocking apparatus correspond to the pin combination of the keyboard interface are connected together to activate the command to clear the password.

5. The method as claimed in claim 4, wherein the unlocking apparatus is made of a flexible flat cable with contacts corresponding to pins of the keyboard interface.

6. The method as claimed in claim 4, wherein the unlocking apparatus is a circuit board with appropriate contacts and configured to be received by the keyboard interface of the computer.

7. A system for clearing a password on an electronic apparatus which has a keyboard, the system comprising:

a keyboard interface having defined pin combinations corresponding to buttons of the keyboard, and an undefined pin combination being defined in a keyboard driver and software of the electronic apparatus as a command to clear an access password of the electronic apparatus; and an unlocking apparatus comprising a plurality of contacts corresponding to contacts of the keyboard interface, wherein two of the plurality of contacts of the unlocking apparatus correspond to the undefined pin combination of the keyboard interface are electrically connected within the apparatus, wherein the unlocking apparatus is capable of being received in the keyboard interface to allow the two electrically connected contacts thereof to activate the command to clear the password.

8. The system as claimed in claim 7, wherein the unlocking apparatus is made of a flexible flat cable.

* * * * *